United States Patent [19]

Tredway, Sr.

[11] E Re. 28,661

[45] Reissued Dec. 23, 1975

[54] GOLF SWING TRAINING GLOVE INCLUDING LIGHT PROJECTING DEVICE

[76] Inventor: Wynn B. Tredway, Sr., P.O. Box 130, Freeport, Pa. 16259

[22] Filed: Jan. 28, 1975

[21] Appl. No.: 544,822

Related U.S. Patent Documents

Reissue of:

[64] Patent No.: 3,811,684
Issued: May 21, 1974
Appl. No.: 368,812
Filed: June 11, 1973

[52] U.S. Cl. ..... 273/183 B; 2/161 A; 116/35 R; 340/86; 240/6.4 W

[51] Int. Cl.[2] ..... A63B 69/36

[58] Field of Search ..... 273/183, 54 B; 116/35 R; 2/160, 161 A; 340/86; 240/6.4 W; 35/29 A

[56] References Cited

UNITED STATES PATENTS

| | | | |
|---|---|---|---|
| 1,165,970 | 12/1915 | Harris | 116/35 X |
| 3,278,944 | 10/1966 | Gowers | 273/183 B |
| 3,707,291 | 7/1971 | Tredway | 273/183 B |

*Primary Examiner*—George J. Marlo
*Attorney, Agent, or Firm*—Sherman H. Barber

[57] ABSTRACT

A golf swing training device wherein a golfer's glove supports and positions a light at the knuckle of the root of the forefinger of a golfer's hand so that when the golfer wears the glove and addresses a ball and then swings the club on the backswing properly, the rays of light from the light on the glove follow a prescribed path on an adjacent wall.

5 Claims, 4 Drawing Figures

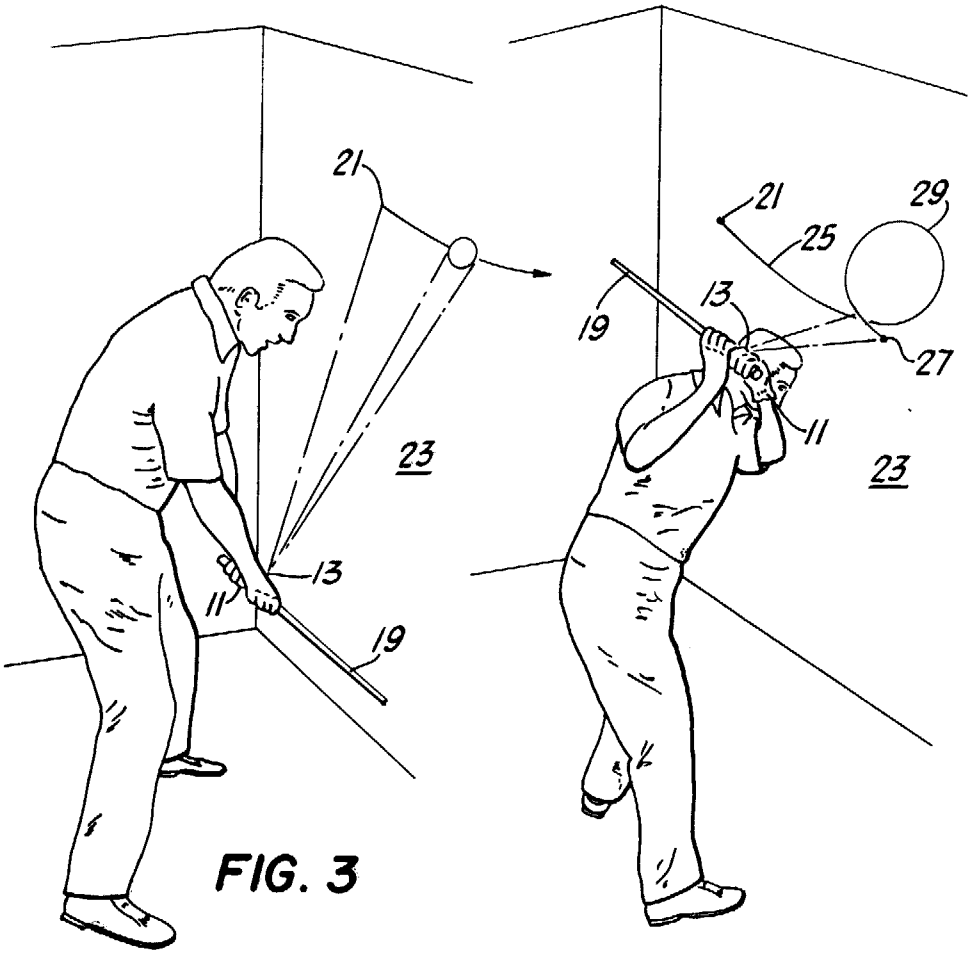
FIG. 4
FIG. 3
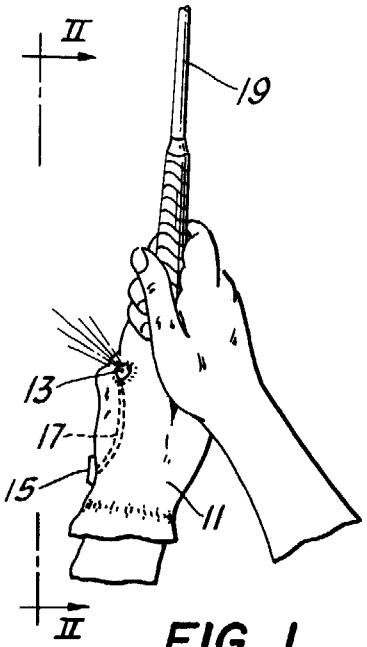
FIG. 1
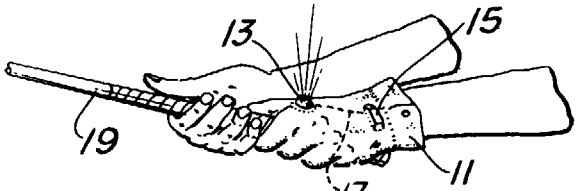
FIG. 2

GOLF SWING TRAINING GLOVE INCLUDING LIGHT PROJECTING DEVICE

Matter enclosed in heavy brackets [ ] appears in the original patent but forms no part of this reissue specification; matter printed in italics indicates the additions made by reissue.

SUMMARY OF THE INVENTION

A golf swing training glove in accordance with my invention comprises a golf glove with a light mounted thereon at the knuckle of the root of the forefinger of one hand, either left or right hand, of the person wearing the glove. The light is powered by a source of power and is controlled by an on-off switch. Rays of light from the light on the glove projected onto an adjacent wall follow a prescribed path on the wall only if the person wearing the glove assumes a proper stance and swings the club properly during the backswing.

For a further understanding of the invention and for features and advantages thereof, reference may be made to the following description in conjunction with the drawing which shows a preferred embodiment of my invention.

BRIEF DESCRIPTION OF THE DRAWING

In the drawing:

FIG. 1 is a schematic view of the hands of a golfer or pupil wearing the glove of my invention and holding a golf club like device at the address position;

FIG. 2 is a view along line II—II of FIG. 1;

FIG. 3 is a schematic view of a person wearing the glove of my invention at the address position and standing adjacent a wall; and FIG. 4 is a view similar to that of FIG. 3, but the person now holds the club like device at the top of the backswing.

DETAILED DESCRIPTION

Referring to FIG. 1, a teaching golf glove 11 in accordance with my invention comprises a leather glove, preferably of the full-finger type, but which may be of the half-finger type if such is preferred. A light 13 is mounted on, or is incorporated into the glove and is positioned at or very close to the knuckle (second metacarpal phalangeal joint) at the root of the forefinger of one hand of the person wearing the glove. If such person is right handed, the light will be positioned at the knuckle of the left forefinger; if left handed, at the knuckle of the right forefinger. Hereinafter, the person referred to as wearing the glove is assumed to be right handed, but the description applies equally to left handed persons.

Associated with the light 13 is a source of power 15 that may be a battery from which wires 17 lead to the light 13. A suitable on-off switch, not shown, is also provided to control the light 13. In some instances the light 13 may be self contained; that is, the bulb, the power source, and the switch may be incorporated in one packaged unit. The wires 17, shown in FIGS. 1 and 2 would not be required in such instance.

The glove 11 is shown being worn on the left hand of a person holding a golf club like device 19 at the address position, as suggested also in FIG. 3.

The light 13 is so oriented with respect to the glove 11 that, when the person of FIG. 3 addresses a golf ball properly, rays of light from the light 13 project to point or spot 21 on adjacent wall 23 which the person faces. Point or spot 21 is an initial point or spot of a prescribed light path mentioned hereinafter.

A golf pupil, and even more experienced golfers as well, find it difficult to know when they grip a golf club properly, and when they move the club properly on the backswing. I have found that a person, be he a pupil or more experienced golfer, who swings a golf club properly on the backswing and moves it to the proper position at the top of the backswing, invariably swings the club properly on the downswing, thereby making proper contact with a golf ball positioned before the person.

Hence, the person of FIG. 3 will know that he grips the club like device properly at the address position when the rays of light from the light 13 fall on the wall 23 at the initial spot or point 21. Then, when the club 19 is moved properly on the backswing, the rays of light trace a path 25 on the wall 23; the path 25 being preselected and a proper path indicator. The rays of light move from left to right as shown in the drawing, around the loop 29 and stop at the terminal point or spot 27 when the club is at the top of the backswing. FIG. 4 shows the person holding the club 19 at the top of the backswing and the rays of the light at the terminal point or spot 27. If the person does not grip the club properly; does not address the ball properly; does not move the club properly on the backswing; and does not achieve the proper position at the top of the backswing, the rays of light will not follow the preselected path 25, will not make the loop 29 and will not terminate at the point or spot 27.

It is a feature of my invention that a golf instructor or an associate of the person, pupil or otherwise, using my golf training glove can readily and easily follow the path of the rays of light from the glove worn by such person and tell such person whether or not he is holding the club properly, is addressing the ball properly, is swinging the club properly and has achieved the proper position at the top of the back swing. Thus, by using the glove of my invention, at least four important elements of a golf swing can be readily and easily analyzed and checked.

Although the invention has been described herein with a certain degree of paticularity, it is understood that the scope of the invention is defined by what is hereinafter claimed.

What is claimed is:

1. In a golf glove, the improvement comprising:
a. a light mounted to said glove; and
b. means securing said light to said glove at the second metacarpal phalangeal joint position of a golfer wearing said glove and so constructed and arranged that when said golfer properly grips a golf club at the address position rays from said light impinge upon an adjacent wall structure at a preselected spot.

2. The invention of claim 1 wherein:
a said light projects rays along a preselected indicator path from said initial spot to a terminal spot when said club is swung properly during the backswing.

3. The invention of claim 2 wherein:
a. said light is removably secured to said glove.

4. The combination comprising:
a. a [golf] glove adapted to be worn on one hand of a person during a training program: and
b. a light [removably] mounted to said glove at the second metacarpal phalangeal joint of said hand and so constructed and arranged thereon that when a person wearing said glove properly grips a [golf] club-*like device* at a starting [the address 1 position rays from said light impinge upon an adjacent wall at a preselected *initial* spot thereon.

5. The invention of claim 4 wherein:

a. said light rays follow a preselected path on said wall from said *preselected* initial spot *to a terminal spot* when said club-*like device* is swung properly during the backswing.

* * * * *